(12) United States Patent     (10) Patent No.:   US 12,604,878 B2

Gatch, III                  (45) Date of Patent:     Apr. 21, 2026

(54) SELF-TAPPING IN-GROUND TERMITE BAIT STATION AND METHOD THEREFORE

(71) Applicant: Howard Lee Gatch, III, Charleston, SC (US)

(72) Inventor: Howard Lee Gatch, III, Charleston, SC (US)

( * ) Notice: Subject to any disclaimer, the term of this patent is extended or adjusted under 35 U.S.C. 154(b) by 0 days.

(21) Appl. No.: 18/933,212

(22) Filed: Oct. 31, 2024

(65) Prior Publication Data

US 2025/0057139 A1     Feb. 20, 2025

(51) Int. Cl.
    *A01M 1/02*        (2006.01)

(52) U.S. Cl.
    CPC .................................. *A01M 1/026* (2013.01)

(58) Field of Classification Search
    CPC ...... A01M 1/026; A01M 1/2011; A01M 1/20; A01M 2200/011; A01M 1/2005
    USPC ........................................ 43/121, 132.1, 131
    See application file for complete search history.

(56) References Cited

U.S. PATENT DOCUMENTS

| | | | | |
|---|---|---|---|---|
| 4,866,880 | A * | 9/1989 | Weinblatt | A01G 29/00 |
| | | | | 222/650 |
| 5,769,107 | A * | 6/1998 | Woodruff | B67D 7/0294 |
| | | | | 137/1 |
| 5,901,496 | A * | 5/1999 | Woodruff | A01M 1/026 |
| | | | | 43/131 |
| 6,003,266 | A * | 12/1999 | Woodruff | A01M 1/026 |
| | | | | 43/131 |
| 6,016,625 | A * | 1/2000 | Bishoff | A01M 1/026 |
| | | | | 431/31 |
| 6,065,241 | A * | 5/2000 | Woodruff | A01M 1/2011 |
| | | | | 43/132.1 |
| 6,100,805 | A * | 8/2000 | Lake | A01M 1/026 |
| | | | | 342/51 |
| 6,474,015 | B1 * | 11/2002 | Lund | A01M 1/2011 |
| | | | | 43/131 |
| 6,606,816 | B2 * | 8/2003 | Oi | A01M 1/14 |
| | | | | 43/132.1 |
| 6,631,583 | B2 * | 10/2003 | Rollins | A01M 1/2011 |
| | | | | 43/132.1 |
| 6,729,067 | B2 * | 5/2004 | Lund | A01M 31/002 |
| | | | | 43/132.1 |

(Continued)

OTHER PUBLICATIONS www.sentricon.com/en-us/why-sentricon.html; Captured on Oct. 2024; 8 Pages.

*Primary Examiner* — Timothy D Collins
*Assistant Examiner* — Maria E Graber
(74) *Attorney, Agent, or Firm* — The Concept Law Group, P.A.; Robert C. Kain, Jr.

(57)            ABSTRACT

The termite bait station is screwed into earth via external screw threads. A cylinder chamber holds a bait stick and slots expose the bait to the earth. The cylinder has external outboard threads. The cylinder's top has a ring with an interlock system which is complementary to an interlock system on a collar region of a detachable handle. The detachable handle and lateral handle hold permits the user, upon handle rotation in one direction to be implanted in the earth and upon handle rotation in another direction to be extracted from the earth. Interlocking systems include keys interlockable with keyways; outboard configured depending legs coacting with respective detents; and inboard configured depending legs coacting with respective detents.

17 Claims, 8 Drawing Sheets

(56)                  References Cited

U.S. PATENT DOCUMENTS

| | | | | | |
|---|---|---|---|---|---|
| 6,772,557 | B2 * | 8/2004 | Laskey | A01M 1/026 | |
| | | | | 43/124 | |
| 6,813,858 | B1 * | 11/2004 | Wright | A01M 1/026 | |
| | | | | 43/132.1 | |
| 6,834,611 | B2 * | 12/2004 | Berthold | A01M 1/2011 | |
| | | | | 43/132.1 | |
| 6,840,004 | B1 * | 1/2005 | Allen | A01M 1/245 | |
| | | | | 43/132.1 | |
| 6,914,529 | B2 * | 7/2005 | Barber | A01M 1/026 | |
| | | | | 340/573.2 | |
| 6,964,124 | B2 * | 11/2005 | Brode, III | A01N 35/06 | |
| | | | | 43/132.1 | |
| 7,086,196 | B2 * | 8/2006 | Cink | A01M 1/026 | |
| | | | | 43/132.1 | |
| D539,867 | S * | 4/2007 | Mediate | D22/122 | |
| 7,497,047 | B1 * | 3/2009 | Aesch, Jr. | A01M 1/2011 | |
| | | | | 43/132.1 | |
| 7,874,099 | B2 * | 1/2011 | Cink | A01M 1/2011 | |
| | | | | 43/132.1 | |
| 7,937,886 | B2 * | 5/2011 | Bernard | A01M 1/2011 | |
| | | | | 43/131 | |
| 7,987,630 | B2 * | 8/2011 | Cink | A01M 1/2011 | |
| | | | | 43/132.1 | |
| 8,322,069 | B2 * | 12/2012 | Cink | A01M 1/2011 | |
| | | | | 43/132.1 | |
| 8,832,994 | B2 * | 9/2014 | Tolley | A01M 1/02 | |
| | | | | 43/132.1 | |
| 9,101,124 | B2 * | 8/2015 | Hill | A01N 25/10 | |
| 9,723,829 | B2 * | 8/2017 | Azzarello | A01M 1/2011 | |
| 10,617,110 | B2 * | 4/2020 | Cink | A01M 1/2011 | |
| D1,100,137 | S * | 10/2025 | Ayres | D23/213 | |
| 2001/0042338 | A1 * | 11/2001 | Jackson | A01M 29/34 | |
| | | | | 43/121 | |
| 2002/0023382 | A1 * | 2/2002 | Snell | A01M 1/026 | |
| | | | | 43/132.1 | |
| 2002/0124458 | A1 * | 9/2002 | Clark | A01M 31/002 | |
| | | | | 43/124 | |
| 2003/0014906 | A1 * | 1/2003 | Roe | A01M 1/2011 | |
| | | | | 43/132.1 | |
| 2004/0031190 | A1 * | 2/2004 | Collins | A01M 1/026 | |
| | | | | 43/132.1 | |
| 2009/0188155 | A1 * | 7/2009 | Tolley | A01M 1/02 | |
| | | | | 43/131 | |
| 2010/0043276 | A1 * | 2/2010 | Eger, Jr. | A01M 1/2011 | |
| | | | | 43/131 | |
| 2015/0027033 | A1 * | 1/2015 | Matsuura | A01M 1/2011 | |
| | | | | 43/131 | |
| 2025/0057139 | A1 * | 2/2025 | Gatch, III | A01M 1/2011 | |

* cited by examiner

SELF-TAPPING IN-GROUND TERMITE BAIT STATION AND METHOD THEREFORE

CROSS-REFERENCE TO RELATED APPLICATION

This application claims priority to U.S. Provisional Patent Application No. 61/547,957 filed Nov. 9, 2023, the entirety of which is incorporated by reference thereto.

FIELD OF THE INVENTION

The present invention relates generally to self-tapping in-ground termite bait station, and, more particularly, relates to a termite bait station adapted to be screwed into earth and a method of baiting and implanting the baited termite bait station.

BACKGROUND OF THE INVENTION

Customarily, termite bait stations include a slotted cylinder into which is placed a termite bait stick. One prior art bait station is made by Sentricon™, also known as Corteva Agriscience of Indianapolis, IN. Prior art termite bait stations oftentimes require that the user dig or drill a hole for the bait station. These prior art stations cannot easily be height adjusted to the ground level. These bait stations cannot the height adjusted to accommodate changing ground level conditions. Also, certain plastic components in these prior art bait stations snap and break off easily. Also, users cannot easily check the condition of the termite bait in the bait stations after the station has been implanted in the earth, that is, after termites have had access to the station. The bait in any particular bait station either decomposes or is taken away by the termites. Hence, users need to be able to extract bait stations to determine the condition of the entrapped bait. Prior art bait stations are quite difficult to extract, rebait, and then re-implant into the earth. Drilling and digging holes for prior art bait stations may puncture water lines, buried telephone lines or internet cables, and buried electrical line.

Furthermore, the top of the prior art bait stations oftentimes get covered by ground soil and get lost in the dirt and grass overtime. There is no easy way to adjust the depth of these prior art bait stations above ground to prevent the stations from being further covered with dirt and grass.

Some prior art termite bait stations can be withdrawn or extracted from the ground in order to re-bait the trap. After extraction, the professional cleans the trap, re-baits the trap and then must clean out the trap bore hole since the surrounding earth oftentimes collapses into the bore hole. A problem exists in that the extraction and cleaning of the previously used bait trap oftentimes structurally breaks and deteriorates components of these prior art devices. These prior art bait traps have plastic tips, lips, ledges, and loops that snap and break off or bend to a useless position when trying to remove bait stations because compacted dirt and small roots intrude into these stations. Often, the entire bait station needs to be dug out of ground in order to check and change bait sticks in these prior art traps.

Therefore, a need exists to overcome the problems with the prior art as discussed above.

SUMMARY OF THE INVENTION

The invention provides a self-tapping in-ground termite bait station, and, more particularly, a termite bait station adapted to be screwed into earth, and a method of baiting and implanting the baited termite bait station, that overcomes the hereinafore-mentioned disadvantages of the heretofore-known devices and methods of this general type.

With the foregoing and other objects in view, there is provided, in accordance with the invention, a termite bait station adapted to be screwed into earth and adapted to accept a termite bait stick. The station includes an elongated cylinder forming a chamber. The cylinder has an open top which can be closed with a cap. A termite bait stick is placed in the chamber. The open top forms by a ring at the upper end of the cylinder. Also, the cylinder has a plurality of slots exposing the chamber to the surrounding earth. An external screw thread is formed on a portion of an outer surface of the cylinder. In a specific embodiment, the screw thread extends from the bottom portions of the ring to the pointed conical end of the cylinder. A detachable handle is provided having at least a laterally extending handle hold (permitting the user to grip the handle). This lateral handle hold region is substantially normal (perpendicular) to the elongated cylinder. In one embodiment, the handle has at least two depending legs which cooperate with at least two detents (hollowed out regions) in the ring such when depending legs engage the detents, upon handle rotation in one direction, the cylinder is adapted to be implanted in the earth and, upon handle rotation in another direction, the cylinder is adapted to extract the cylinder from the earth.

Functionally, the method of baiting and implanting a baited termite bait station into the earth includes providing an open topped elongated slotted cylinder with a chamber within which is disposed a terminate bait stick. The slotted cylinder provides access to the encased termite bait in the cylinder. The slotted cylinder has an external screw thread which, in one embodiment, extends the longitudinal length of the slotted cylinder. The user screws the cylinder into the earth by rotating the cylinder in one direction and causing earth to pass along the external screw threads. Either before or after implantation of the baited stations, the user caps the open topped cylinder. The method also includes extracting the bait station from the earth or ground by rotating the cylinder in another direction (opposite the implantation direction) and causing earth to pass along the external screw threads in that another direction. The user then removes the cap from the cylinder. The user then withdraws the used or depleted termite bait stick from the chamber and rebaits the chamber with another termite bait stick. The user then recaps the newly baited cylinder. The baited stations is then screwed into the earth by rotating the cylinder in the one, implanting, direction and causing earth to pass along the external screw threads in that one direction.

The detachable handle solves several issues associated with prior art termite bait stations, including but not limited to (a) digging or using a drill rig to dig the stations hole; (b) adjusting the height adjusted to the ground level (sometimes to accommodate changing ground level conditions); (d) avoiding broken parts and components because the prior art devices are pulled and extracted from the earth without the assistance of external screw threads; (e) the invention enables the user to check the condition of the termite bait in the bait stations after implantation; (f) reducing the extraction, rebaiting, and re-implantation; (g) avoiding puncture of underground water lines, buried telephone lines; internet coaxial cables, and buried electrical lines (the invention provide tactile feedback to the user during implantation); and (h) reducing re-implantation efforts after rebaiting the station.

In accordance with another feature, an embodiment of the present invention includes a T-shaped handle with a depending member forming a base of the T-shaped handle and the laterally extending handle hold formed by a top of the T-shaped handle. The T-shaped handle may be laterally truncated to form an inverted L-shaped handle. In some embodiments, the ring formed at the top of the cylinder has a female thread and the cap has a complementary male thread.

The ring may have at least two detents formed on an upper surface of the ring. These detents or open-top slots form a keyway for the two depending legs (acting as keys) which depend from the depending member of the handle. The depending legs cooperate with the two detents such that the cylinder can to be implanted in the earth by handle rotation in one direction and extracted from the earth by handle rotation in the other direction. There may be several detents (keyways) and several complementary depending legs acting as keys which fit into the detents.

In one embodiment, the two detents are formed on an inboard surface of the ring. The two depending legs each have respective laterally outboard extending terminal ends. These terminal ends to cooperate with corresponding detents. This is similar to outboard keyways which coact with depending legs from the detachable handle.

A further embodiment has detents formed as arcuate inboard channels formed on the inboard surface of the ring. The depending legs, in this embodiment, engage the arcuate detents and the terminal ends of the legs travel in the respective arcuate channels when the handle is rotated in the extraction direction. The arcuate channels enable the user to pull up the bait station while substantially simultaneously unscrewing the bait station from the ground. Sometimes these inboard arcuate channels have rotational stops. These stops block and lock the terminal ends of the depending legs into the arcuate channels and prohibit further, free rotational movement of the handle with respect to the cylinder. Once the terminal ends are proximate the rotational stops, further rotational movement of the handle is imparted to the cylinder, hence, both the handle and the cylinder rotate together, and thereby ceasing the cylinder to be unscrewed and extracted from the in-ground position.

Another embodiment of the termite bait station has the ring with respective vertically oriented longitudinal inboard channels for each terminal end of the depending legs such that the terminal ends travel in the longitudinal inboard channels when the depending legs are inserted into the ring. Each arcuate channel in the ring is bifurcated by the respective longitudinal inboard channel and each corresponding arcuate channel has a first and a second rotational stop such that terminal ends travel in the first part of the bifurcated arcuate channel upon handle rotation in one direction (which assists cylinder implantation into the earth) and during an extraction operation, the terminal ends travel in a second part of the bifurcated arcuate channel when the handle is rotated in the another direction.

In a different embodiment, the two detents (there may be more than two detents in the ring) are formed on an outboard surface of the ring. In this embodiment, the two depending legs (each leg coacting with a respective detent) each have laterally inboard extending terminal ends. These terminal ends cooperate with the detents. Further, in a more developed embodiment, each detent includes a corresponding outboard arcuate channel formed on the outboard surface of the ring. When depending legs engage the detents, terminal ends travel in the outboard arcuate channels upon handle rotation in a certain direction (adapted to assist cylinder extraction from the earth). These outboard arcuate channels may have a rotational stop adapted to assist cylinder extraction from the earth.

A different embodiment of the invention has each respective terminal end forming a latch element. The corresponding outboard arcuate channels are corresponding strike elements. Sometimes, the two depending legs are hinged to the depending member of the handle such that the latch element moves laterally into and out of the corresponding strike element (that is, the corresponding arcuate channel).

Another enhancement has the ring including a vertically oriented longitudinal outboard channel for the latch element such that the latch element vertically travels in the longitudinal outboard channel when the depending legs are inserted into the ring. In this system, each arcuate outboard channel is bifurcated by the longitudinal outboard channel. Hence, each arcuate outboard channel has a first and a second rotational outboard stop (the arcuate channel bifurcated into first and second arcuate channel segments). The latch elements travel in the first part of the bifurcated arcuate outboard channel upon handle rotation in the one direction. This assists cylinder implantation into the earth. Further, latch elements travel in a second part of the bifurcated arcuate outboard channel upon handle rotation in the other direction to assist cylinder extraction from the earth.

A different embodiment of the invention includes an elongated cylinder which forms a chamber. The cylinder has an open top which permits insertion of the termite bait stick into the chamber. The open top has a ring at an upper end of the cylinder. The cylinder is slotted and has a plurality of slots exposing the inboard portions of the chamber to the earth (hence also exposing the termite bait to the surrounding earth). The ring carries a rotatable latch. The latch is moved from an unlocked position to the locked position based upon a user actuatable lever. The latch includes a catch hook adapted to be rotated by the lever. The system has a detachable cap for closing the open top of the cylinder. A screw thread is formed on a portion of an outer surface of the cylinder. In one embodiment, the outward, exposed screw thread runs the longitudinal extent of the cylinder except for the conical points lower end of the cylinder. The system includes a detachable handle having a laterally extending handle hold substantially normal to the elongated cylinder. The handle has a depending strike plate which cooperates with catch hook. When the catch hook is on the strike plate, the handle is locked and handle rotation in one direction causes the cylinder to be implanted in the earth. Handle rotation in the other direction causes the cylinder to be extracted from the earth.

Another embodiment of the system includes an elongated cylinder forming a chamber. The cylinder has an open top adapted to accept the termite bait stick therein. The open top forms a ring at the upper end of the cylinder. The cylinder has a plurality of slots exposing the inboard chamber to the earth (and the subject termites). The ring has a depending strike plate. The system includes a detachable cap for closing the open topped cylinder. A screw thread is formed on a portion of the outer surface of the cylinder. Sometimes the outboard screw thread extends the length of the cylinder. A detachable handle has a laterally extending handle hold substantially normal to the elongated cylinder. The handle has opposing depending legs. These opposing, opposite legs support a rotatable latch. The latch has an outboard extending user actuatable lever and an inboard catch hook adapted to be rotated by the user's actuation of the lever. The catch hook captures the depending strike plate and locks the handle to the ring and the cylinder. When locked, handle rotation in one direction causes the cylinder to be implanted in the earth. Upon handle rotation in the other direction, this causes the cylinder to be extracted from the earth.

Although the invention is illustrated and described herein as embodied in a self-tapping in-ground termite bait station, and, more particularly, a termite bait station adapted to be screwed into earth and a method of baiting and implanting the baited termite bait station, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "front", "back", "head", "tail", "inboard", "outboard" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the elongated cylinder carrying the termite bait. The term "lateral" refers to a position normal or generally perpendicular to the longitudinal extent of the cylinder. The term "inboard" should be understood as being a position relative to the longitudinal axis of the cylinder whereas the term "outboard" refers to positions opposite an inboard position. Those skilled in the art can understand the specific meanings of the above-mentioned terms in the embodiments of the present invention according to the specific circumstances.

Conjunctive language such as the phrase "at least one of X, Y, and/or Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where similar reference numerals refer to identical or functionally similar elements throughout the separate views and which together with the detailed description below are incorporated in and form part of the specification, serve to further illustrate various embodiments, and explain various principles and advantages all in accordance with the present invention.

FIG. 3A shows a partly broken away side view and FIG. 3B shows a top view of the keyway bearing ring. It should be noted that the key-keyway interlock system can be reversed such that the ring has upstanding legs forming keys and the handle's collar forms keyways.

FIGS. 4A and 4B show the latch hook rotatably mounted on the ring of the cylinder and FIG. 4C shows latch hook rotatably mounted on the collar of the handle.

DETAILED DESCRIPTION

Figure 1:
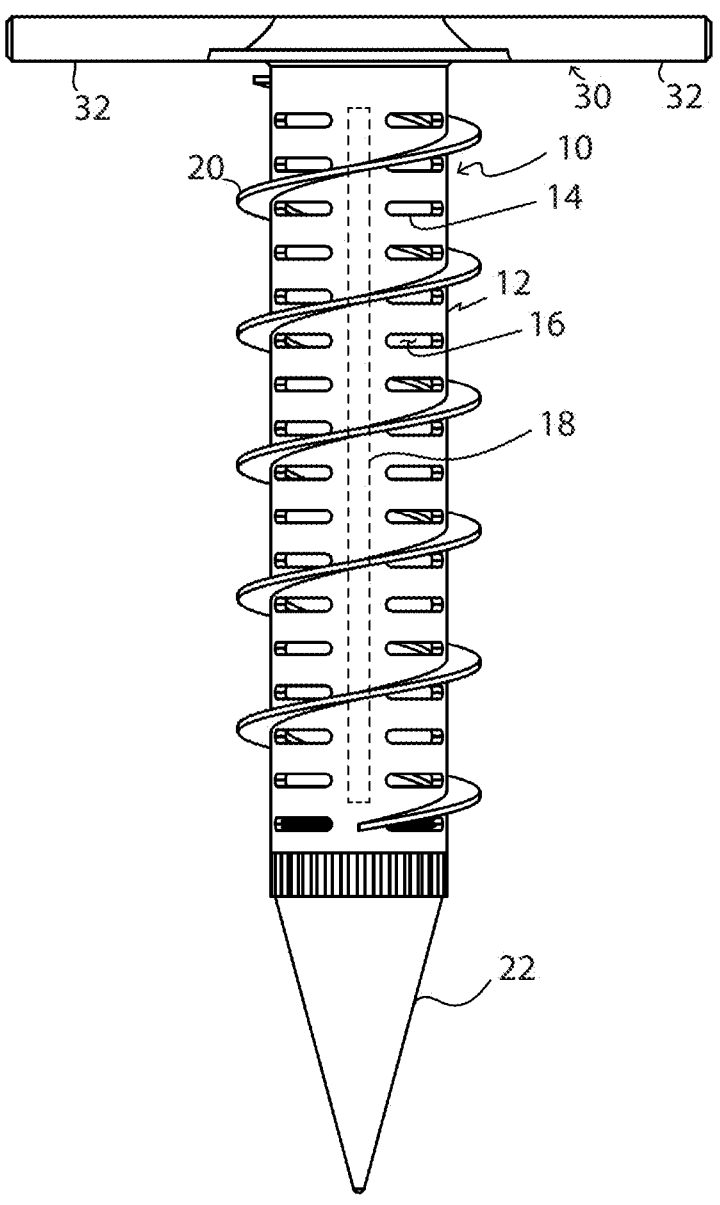
FIG. 1 is front, elevational view of one embodiment of the present invention, namely, a self-tapping in-ground termite bait station, and, more particularly, a termite bait station adapted to be screwed into earth, in accordance with the principles of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is front, elevational view of one embodiment of the present invention, namely, a self-tapping in-ground termite bait station, and, more particularly, a termite bait station adapted to be screwed into earth, in accordance with the principles of the present invention. Bait station 10 includes a hollow cylinder 12 with a plurality of openings or slots 14 (the term slots also referring to any type of opening permitting access to the interior chamber of the cylinder 12. The slots or openings expose the inboard chamber 16 of cylinder 12 to the environment. Slots 14 exposed chamber 16 to the surrounding earth or ground. A bait stick 18 is disposed within chamber 16 such that cylinder 12 carries the bait stick and, once implanted, the bait stick is exposed to the surrounding earth via the plurality or number of slots 14 in cylinder 12. The cylinder is ultimately placed in the earth or ground and the bait stick attracts termites via the slotted openings 16. An external screw thread 20 is formed on at least a longitudinal portion of the outer surface of the cylinder 12. In the illustrated embodiments, screw thread 20 extends the longitudinal extent of bait station 10 except for conical end piece 22. However, the screw threads may only partly extend the longitudinal extent of cylinder 12.

A detachable handle 30 is shown in FIG. 1. Handle 30 is attached to the upper end of cylinder 12. Since handle 30 includes handle hold portion 32 and the cylinder 12 has an external screw thread 20, a user can easily screw in or implant bait station 10 into the earth or ground and, at a different time, extract bait station 10 from the ground by reverse rotation of handle 30. Handle 30 has at least one laterally extending handle hold 32 which enables the user to rotates bait station 10 to implant or to extract station 10 from the earth. Rather than a T-shaped handle shown in the figures, an inverted L-shaped handle may be used.

Figure 2:
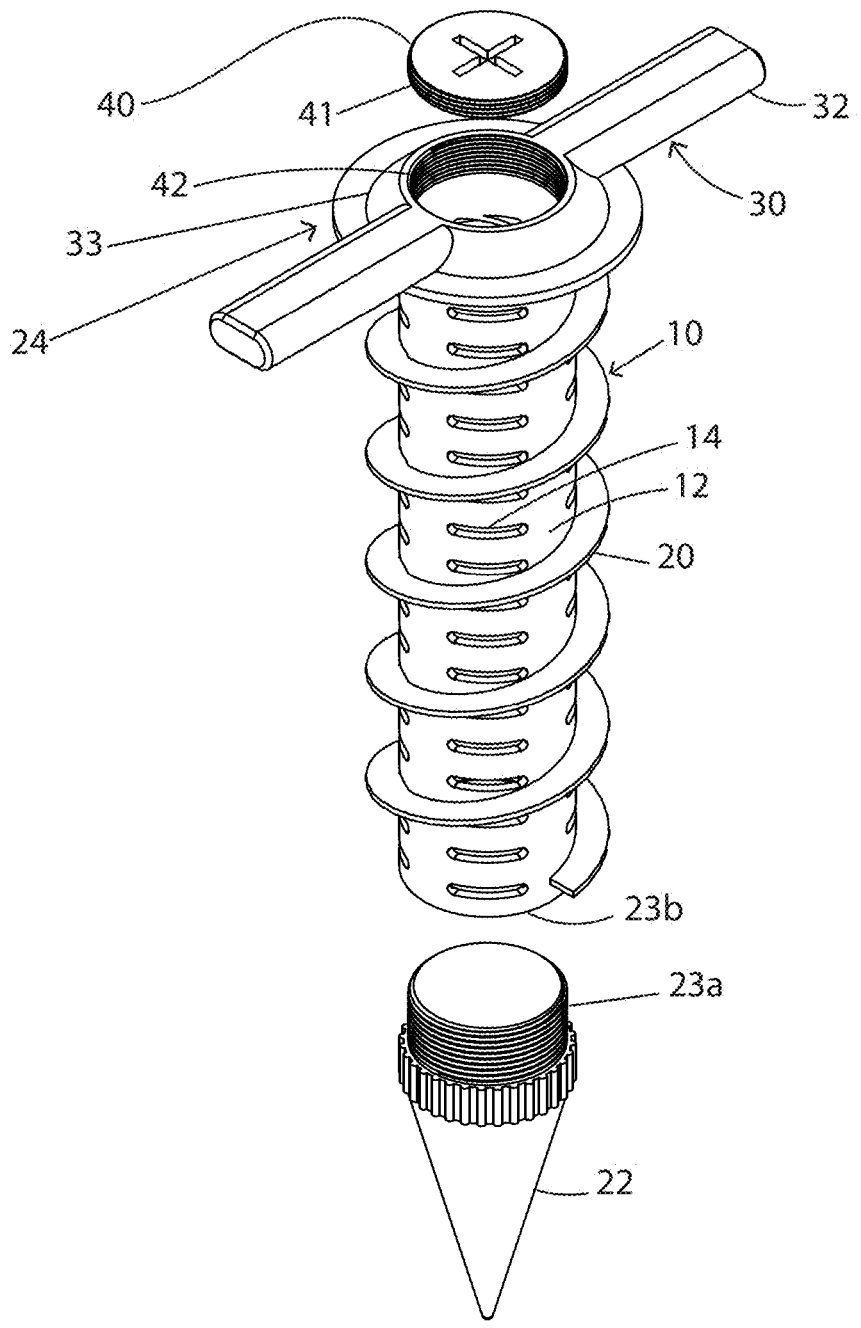
FIG. 2 is an exploded view of the embodiment of the present invention shown in FIG. 1 in accordance with the principles of the present invention.

FIG. 2 is an exploded view of the embodiment of the present invention shown in FIG. 1. FIG. 2 shows that bait station 10 has a detachable cap 40 that can be used to close an upper ring portion 24 of cylinder 12. The upper ring portion 24 of cylinder 12 includes female screw threads 42 which are complementary to male screw threads 41 on cap 40. Ring 24 is formed about the open top of cylinder 12. In FIG. 2, detachable handle 30 has a collar region 33 which collar is removably attachable to ring 24 of cylinder 12.

FIG. 2 also shows that conical end component 22 is threadably attached by male threads 23a to female threads 23b on the inboard side of the lower end portion of cylinder 12. Female threads 23b are not shown in FIG. 2 but are well known as connecting elements in the art.

One of the several important aspects of the present invention is the detachable nature of handle 32 from bait carrying cylinder 12. FIGS. 3A through 7 diagrammatically illustrate various interlock systems permitting handle 32 to be attached and temporarily affixed cylinder 12. In a broad sense, detachable handle 30 includes a laterally extending handle hold 32 which at least laterally extends in a direction normal to the longitudinal axis of cylinder 12. In other words, although a T-shaped handle is shown in FIGS. 1 and 2, an inverted L-shaped handle 30 may be utilized. Further, the detachable handle generally includes a depending collar element which coacts with the ring 24 at the top open end of cylinder 12. Sometimes, the handle interlock is incorporated into the entirety of the handle. For example, see FIGS. 4B, 4C, 5A and 6A. A ring bearing interlockable member is formed on or carried by cylinder ring 24 and a complementary collar bearing interlock member is formed on or carried by handle collar 33. When the ring bearing member locks onto the collar bearing member in a locked condition, handle rotation in one direction causes cylinder 12 to be implanted into the earth by the surrounding earth moving along screw threads 20 and pulling the cylinder into the ground. Further, in a locked condition, handle rotation by a user in an opposite direction (opposite implantation), causes the cylinder to be extracted from the earth due to the earth passing along screw threads 20 in a different direction, that is, a direction different than the implantation direction. In this manner, the inventive method of baiting and implanting a baited termite bait station into the earth involves providing an open top, elongated, slotted cylinder 12 which carries termite bait stick 18. Slots 14 in cylinder 12 provide access to the termite bait. Screwing the cylinder into the earth is caused by rotating the cylinder in one direction via handle 30 and causing earth to pass along the external screw threads 20. Once implanted, the user caps and closes the open top of the cylinder 12. See FIG. 2. Optionally, the user may cap the cylinder after implantation into the earth. The method also includes extracting the bait station from the earth by rotating the cylinder in the other, extraction direction and causing earth to pass along the external screw threads 20 in that other direction. The user removes the cap, withdraws old termite bait stick from chamber 16 of cylinder 12 (FIG. 1), rebaits the cylinder with another termite stick 18, recaps baited open topped cylinder 12 with cap 40 and screws the cylinder into the earth by rotating the cylinder in the one implantation direction again causing earth to pass along external screw threads 20 in that implantation direction. Embodiments show interlock systems in FIGS. 4A through 7.

Figure 3A:
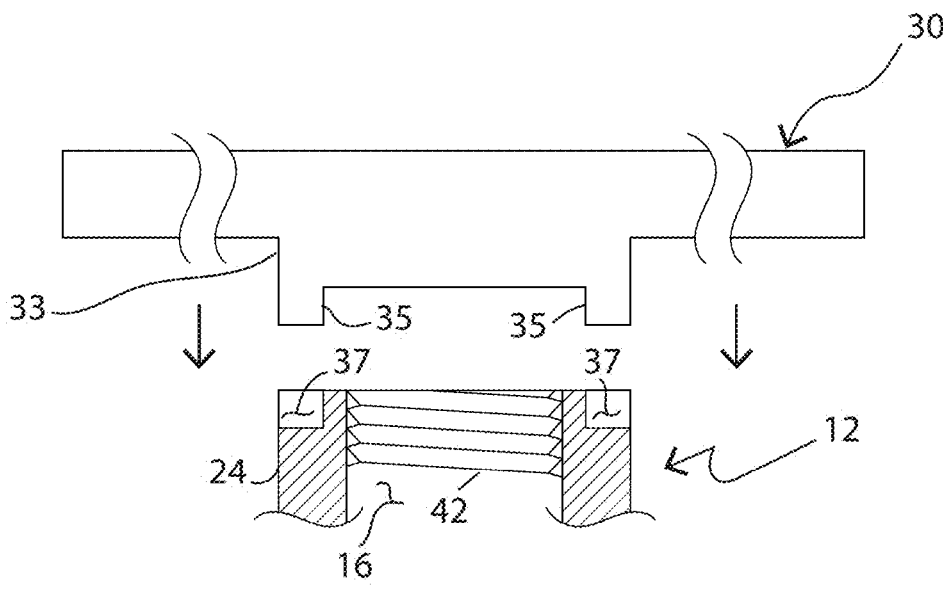
FIGS. 3A and 3B show partial views of portions of the handle and the upper ring of the bait-retaining cylinder and, more particularly, the depending leg keys from the handle collar and the ring's complementary detented keyways as an embodiment of the invention.
Figure 3B:
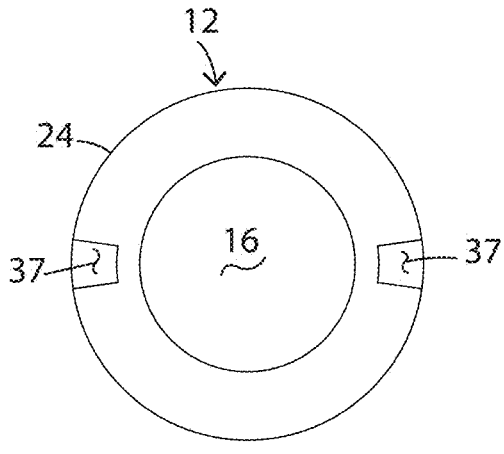

FIGS. 3A and 3B show partial cut-away or sectional views of portions of the handle 30, the upper ring 24 of the bait-retaining cylinder 12 and, more particularly, depending leg keys 35 (depending from handle collar 33) and the ring's complementary detent keyways 37 as an embodiment of the invention. In this illustrated embodiment, the detents are cutouts on the top surface of the cylinder ring 22. FIG. 3A shows a partly broken away side view of ring 24 and FIG. 3B shows a top view of the keyway bearing ring 24. The detents for the keyways. It should be noted that the key-and-keyway interlock system can be reversed such that the ring 24 has upstanding legs forming keys and the handle's collar 33 forms keyways. The detents would be formed in the underside of the handle's collar 33.

Figure 4A:
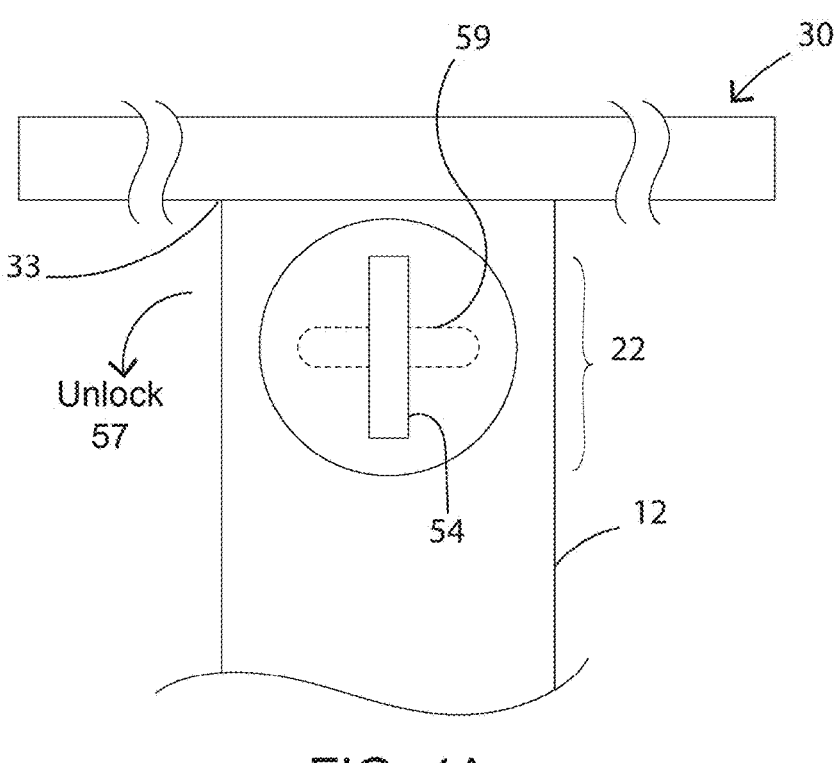
FIGS. 4A, 4B and 4C show partial views of portions of the handle, the handle collar, and the upper ring of the bait-retaining cylinder and, more particularly, show a latch system for locking the detachable handle to the bait-carrying cylinder (the external screw thread not shown in these figures) as an embodiment of the invention.
Figure 4B:
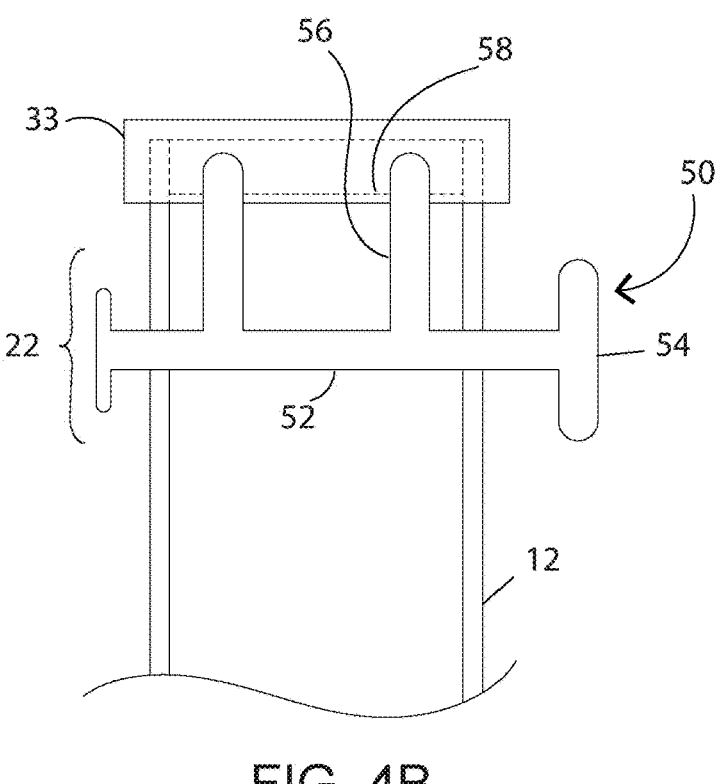
Figure 4C:
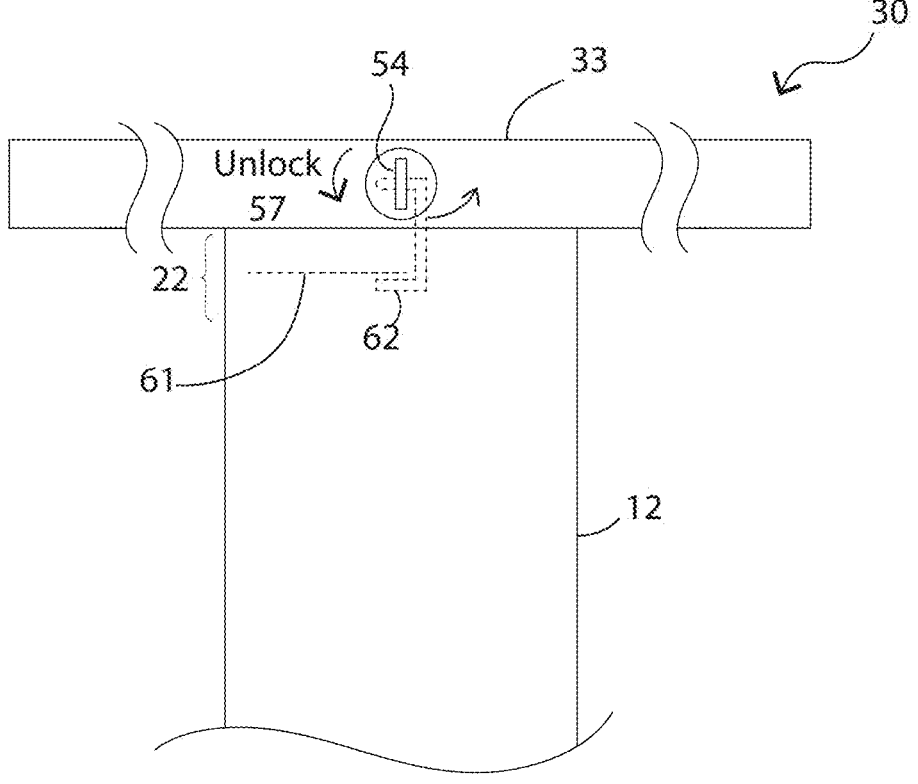

FIGS. 4A, 4B and 4C show partial views of portions of the handle 30, and diagrammatically illustrate handle collar 33 and illustrate the upper ring region 22 of the bait-retaining cylinder 12. More particularly, FIGS. 4A, 4B and 4C show a latch system 50 for locking the detachable handle 30 to the bait-carrying cylinder 12 (the external screw thread 20 not shown in these figures). FIGS. 4A and 4B show the latch hook 56 is rotatably mounted on the ring 22 of the cylinder 12. Latch system 50 includes a user actuatable handle or lever 54 which enables the user to rotate the latch axle 52 and latch hook 56 about axle 52. Axle 52 is mounted in the ring region 22 of cylinder 12. The latch hook 56 is L-shaped with one end attached to axle 52 and the other free end of the L-shaped hook 56 free to capture depending surface 58 in the collar 33 of handle 30. The user, in the illustrated embodiment, places the handle 30 in a locked position when the lever handle 54 is vertical. The user unlocks handle 30 from the ring 22 by rotating lever 54 in unlock direction 57 shown in dashed lines 59 in FIG. 4A. In the unlocked position, the free end of latch hook 56 is withdrawn from lock strike plate 58 of collar 33 of handle 30.

FIG. 4C shows a reverse interlock system compared to the interlock system of FIG. 4A. In FIG. 4C, latch hook 56 rotatably mounted on or in the collar 33 of the handle. In this embodiment, user actuatable lever 54 causes an axle (not shown) to rotate in handle collar 33. When rotated by the user in the unlock direction 57, the free end 62 of the hook latch 56 rotates away from lock strike plate 61 formed in the ring 22 of cylinder 12. Stated otherwise in FIG. 4A, the hook latch 56 is rotatably mounted in or on the cylinder ring 22 whereas in FIG. 4C, the hook latch 56 is rotatably mounted in or on the handle collar 33. In FIG. 4A, the ring bearing interlock member is hook latch 50 rotatable with respect to ring 33 (FIG. 4B) and the complementary collar bearing interlock member is internally configured lock strike surface 58. In FIG. 4C, the ring bearing interlock member is lock strike surface 61 in ring 22 and the complementary collar bearing interlock member is hook latch 50 rotatable in or on the handle collar 33. In both FIGS. 4A and 4C embodiments, when locked and upon further handle rotation in one direction, the cylinder 12 is adapted to be implanted in the earth due to screw thread 20 interacting with the earth or ground and, upon handle rotation in another direction, the cylinder 12 is adapted to extract the cylinder from the earth due to counterrotation of screw thread 20 interacting with the earth or ground.

Figure 5A:
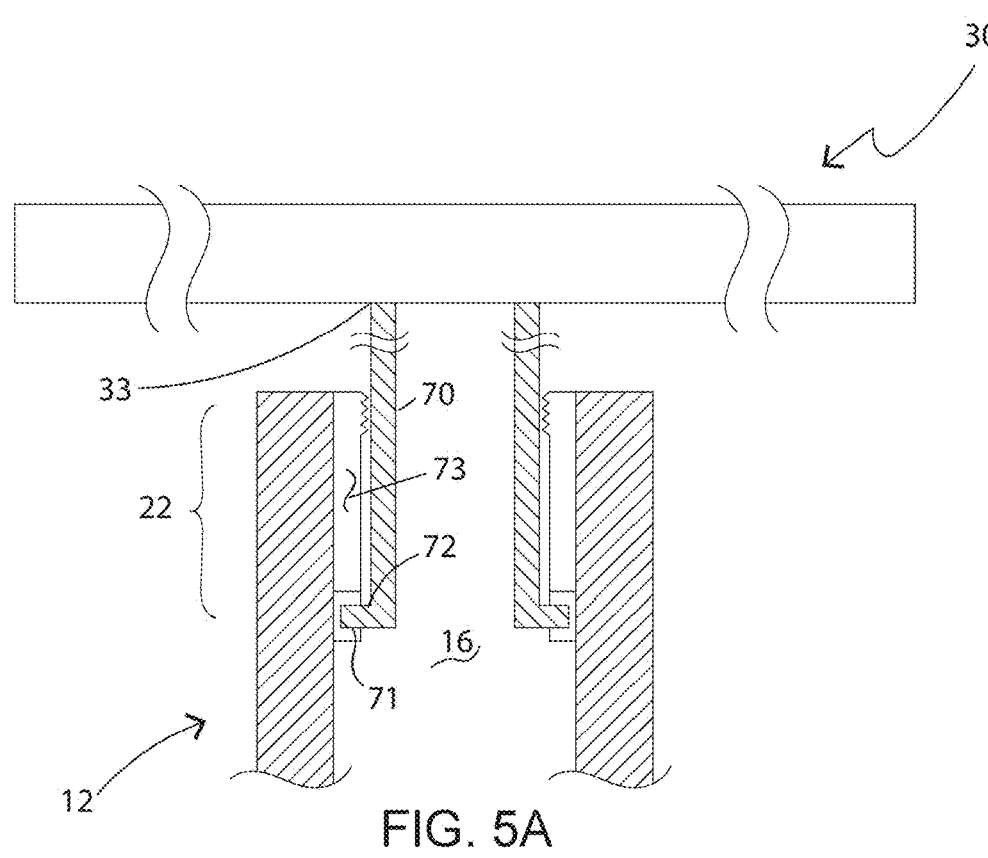
FIGS. 5A and 5B show an interlock system wherein depending legs from the handle collar have outboard extending terminal ends coacting with corresponding inboard facing detents in the cylinder ring and further show, in FIG. 5B, the bifurcated channels within which the terminal ends travel in the implant and the extract directions as an embodiment of the invention.
Figure 5B:
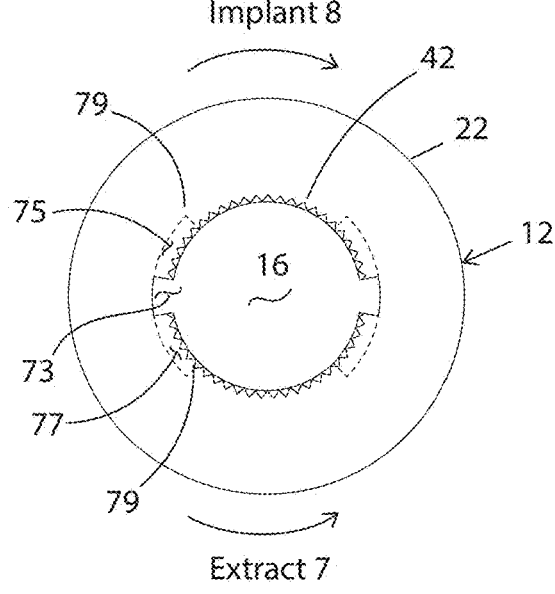

FIGS. 5A and 5B show an interlock system wherein depending legs 70 from the handle collar 33 have outboard extending terminal ends 72 coacting with corresponding inboard facing detents 73 in the cylinder ring 22. Detents are inboard facing and are, in general, open to chamber 16. In FIG. 5B, the bifurcated channels 75, 77 are shown and terminal ends 72 of the depending legs 70 travel in channel 75 in an implant direction 8 and in channel 77 in an extract direction 7 in this illustrated embodiment of the present invention. Handle 30 is diagrammatically illustrated in FIGS. 4A-4C, 5A and 6A. Further, handle collar 33 is diagrammatically illustrated in FIGS. 4A-4C, 5A and 6A. In FIG. 5A, depending legs 70 from collar 33 generally extend inboard into hollow chamber space 16 of cylinder 12. At the terminal end of legs 70, the legs carry respective outboard extending terminal ends 72. FIGS. 5A and 5B show that cylinder ring 22 includes an inboard facing, vertical, longitudinal channel 73 through which terminal end 72 passes when the user inserts the depending legs 70 of handle 30 into ring region 22 of cylinder 12. In order to facilitate a better lock interconnection between the handle and the cylinder, ring 22 includes inboard locking channels 75, 77 which cooperate with respective terminal ends 72 from each leg 70 such that the terminal ends 72 can pass through inboard facing channels 75 during implant rotation 8 and, in a counterrotation operation, terminal ends 72 travel through inboard facing lateral channel 77 during extraction rotation 7. Channels 75, 77 include rotational stop walls 79 which prohibit further rotation of terminal ends 72 during implantation or extraction. To remove or withdraw handle 30 from cylinder 12, the user rotates terminal ends 72 until they are aligned with the vertical longitudinal channels 73 in collar region 22. It should be noted that cap 40 (FIG. 2) is screwed onto ring region 22 by female threads 42.

Figure 7:
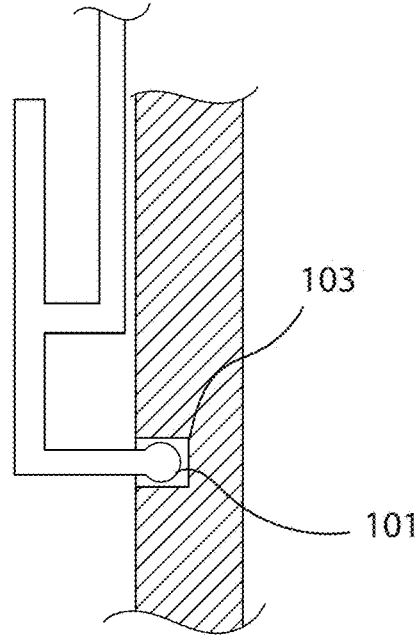
FIG. 7 is a simple illustration of a bulbous terminal end.

It should be noted that the interlock system in FIGS. 5A and 5B can be reversed such that legs 70 at upstanding from the cylinder ring 22 and detents 71, and sometimes arcuate channels 75, 77 can be formed on handle collar 33. Further, other embodiments of the invention may eliminate inboard locking channels 75, 77. In other words, a well-designed single detent 103 as shown in FIG. 7 may suffice to capture terminal end 71 without the inboard locking channels 75, 77 cooperating with respective terminal ends 72 from each leg 70.

Figure 6A:
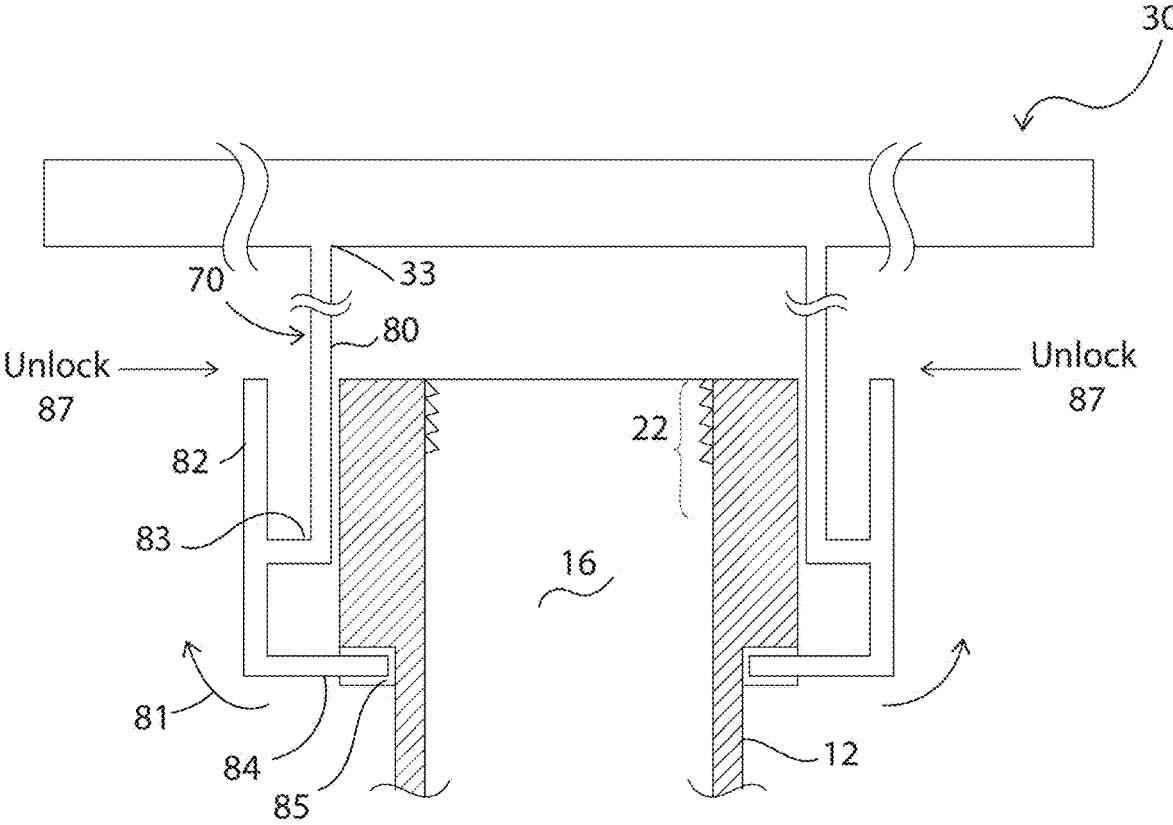
FIGS. 6A and 6B show an interlock system wherein hinged depending legs from the handle collar have inboard extending terminal ends coacting with corresponding outboard facing detents in the cylinder ring and further show, in FIG. 6B, the bifurcated channels within which the terminal ends travel in the implant and the extract directions as an embodiment of the invention. The depending leg elements that carry the terminal ends are hinged such that the terminal ends partly rotate or arcuately move into and out of the ring's detent.
Figure 6B:
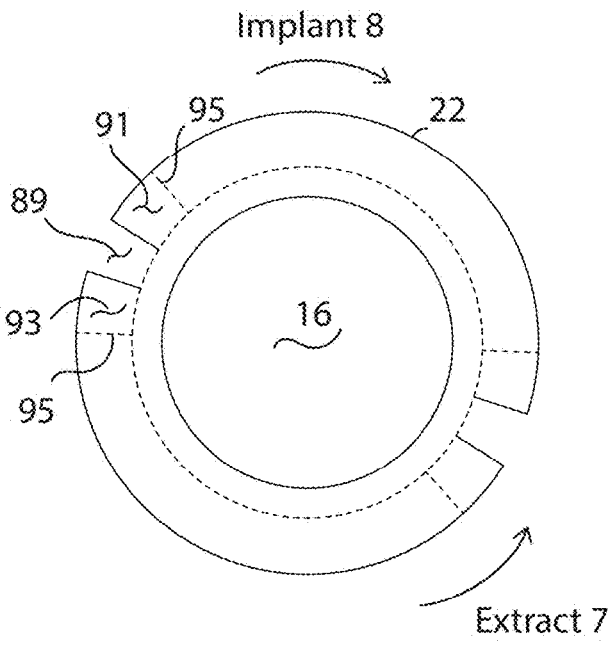

FIGS. 6A and 6B show an interlock system wherein a hinged leg system 70 (collectively including elements 82, 83 and 84) depending from the handle collar 33 has inboard extending terminal ends 84 coacting with corresponding outboard facing detents 85 on the cylinder ring 22. In FIG. 6B, the ring's bifurcated outboard facing channels 91, 93 capture the terminal ends 84 and permit the terminal ends 84 to travel in channels 91, 93 during the implant and the extract directions. The depending leg element 70 carries terminal ends 84 which are hinged such that the terminal ends 84 partly rotate (in an arcuate manner) out of and into the detent 85. In more detail, FIG. 6A shows that handle collar 30 has depending leg system 70. Each depending leg system 70 includes a depending leg element 80 and a user actuatable bar 82. The actuatable bar 82 is hinged at hinge 83 to the depending leg element 80. Bar 82 extends from an upper user-actuatable segment to a lower terminal end segment with hinge 83 separating the upper and lower elements. Terminal end 84 of the depending leg system 70 is on the opposite side of actuatable bar 82, that is, opposite hinged 83. The result is that an unlock force 87 laterally applied to bar 82 causes terminal end 84 to rotate in direction 81 away from outboard facing detent 85 of ring 22. In this manner, and handle 30 can be detached from cylinder 12.

To facilitate placement of terminal end 84 in detent 85, FIG. 6B shows that cylinder collar 22 includes and outboard facing vertical, longitudinal channel 89 which permits the user to slide terminal end 84 of depending leg system 70 into the detent 85 (see detent 85 in FIG. 6A). Detent 85 is bifurcated by the vertical channel 89 and such bifurcation forms first and second detent channels 91, 93. Each of these outboard facing detent channels 91, 93 have a rotational stop surface 95 that prohibits further terminal end 84 movement during rotational action in implant direction 8 and during rotational action in extraction direction 7.

It should be noted that the interlock system in FIGS. 6A and 6B can be reversed such that leg systems 70 are upstanding from the cylinder ring 22 and detents 85, and sometimes arcuate channels 91, 93 are formed on handle collar 33. Further, other embodiments of the invention may eliminate inboard locking channels 91, 93. In other words, a well-designed single detent 103 as shown in FIG. 7 may suffice to capture terminal end 84 without the inboard locking channels 91, 93 cooperating with respective terminal ends 84 from each leg system 70.

FIG. 7 diagrammatically illustrates that the terminal end 101 may be bulbous or slightly rounded. Therefore, earlier illustrations of the terminal end as being rectangular or as having sharp, defined edges may be replaced by rounded edges or a bulbous end. As explained, channels 75, 77 and 91, 93 may be eliminated from the embodiments provided that some detachable and attachable interlock system is used between the handle and the bait carrying cylinder.

The claims appended hereto are meant to cover all modifications and changes within the scope and spirit of the present invention.

What is claimed is:

1. A termite bait station adapted to be screwed into earth and adapted to accept a termite bait stick comprising:

an elongated cylinder forming a chamber, the cylinder having an open top adapted to accept the termite bait stick into the chamber, the open top formed by a ring at an upper end of the cylinder, the cylinder having a plurality of slots exposing the chamber to the earth;

a detachable cap for closing the open top;

a screw thread formed on a portion of an outer surface of the cylinder;

a detachable handle having a laterally extending handle hold substantially normal to the elongated cylinder, the handle having at least two depending legs which cooperate with at least two detents in the ring such when depending legs engage the detents, upon handle rotation in one direction the cylinder is adapted to be implanted in the earth and upon handle rotation in another direction the cylinder is adapted to extract the cylinder from the earth;

the handle is a T-shaped handle with a depending member forming a base of the T-shaped handle and the laterally extending handle hold formed by a top of the T-shaped handle;

wherein the at least two depending legs depend from the depending member and the at least two depending legs cooperate with the at least two detents such that the cylinder is adapted to be implanted in the earth by handle rotation in one direction and extracted from the earth by handle rotation in the another direction;

wherein the at least two detents are formed on an inboard surface of the ring;

wherein the at least two depending legs each have a respective laterally outboard extending terminal end, the respective terminal end adapted to cooperate with a corresponding one of the at least two detents; and wherein each corresponding detent includes at least one corresponding arcuate channel formed on the inboard surface of the ring such that when depending legs engage the detents, the respective terminal end is adapted to travel in the corresponding arcuate channel upon handle rotation in the another direction and adapted to assist cylinder extraction from the earth.

2. The termite bait station as claimed in claim 1 wherein the T-shaped handle is laterally truncated to form an inverted L-shaped handle.

3. The termite bait station as claimed in claim 1 wherein the ring has a female thread and the cap has a complementary male thread.

4. The termite bait station as claimed in claim 1 wherein the at least two detents are formed on an upper surface of the ring.

5. The termite bait station as claimed in claim 1 wherein each corresponding arcuate channel has a rotational stop adapted to assist cylinder extraction from the earth.

6. The termite bait station as claimed in claim 5 wherein:

the ring includes a respective vertically oriented longitudinal inboard channel for the respective terminal end such that the respective terminal end is adapted to travel in the respective longitudinal inboard channel when the at least two depending legs are inserted into the ring;

each of the at least one corresponding arcuate channel is bifurcated by the respective longitudinal inboard channel and each corresponding arcuate channel has a first and a second rotational stop such that the respective terminal end is adapted to travel in a first part of the bifurcated arcuate channel upon handle rotation in the one direction and adapted to assist cylinder implantation into the earth and such that the respective terminal end is adapted to travel in a second part of the bifurcated arcuate channel upon handle rotation in the another direction and adapted to assist cylinder extraction from the earth.

7. The termite bait station as claimed in claim 1 wherein the at least two detents are formed on an outboard surface of the ring.

8. The termite bait station as claimed in claim 7 wherein the at least two depending legs each have a respective laterally inboard extending terminal end, the respective terminal end adapted to cooperate with a corresponding one of the at least two detents.

9. The termite bait station as claimed in claim 8 wherein each corresponding detent includes at least one corresponding outboard arcuate channel formed on the outboard surface of the ring such that when depending legs engage the detents, the respective terminal end is adapted to travel in the corresponding outboard arcuate channel upon handle rotation in the another direction and adapted to assist cylinder extraction from the earth.

10. The termite bait station as claimed in claim 9 wherein each corresponding outboard arcuate channel has a rotational stop adapted to assist cylinder extraction from the earth.

11. The termite bait station as claimed in claim 10 wherein each respective terminal end is a respective latch element and each corresponding outboard arcuate channel is a corresponding strike element.

12. The termite bait station as claimed in claim 11 wherein the at least two depending legs are hinged to the depending member of the handle such that the respective latch element is adapted to move laterally into and out of the corresponding strike element.

13. The termite bait station as claimed in claim 12 wherein:

the ring includes a respective vertically oriented longitudinal outboard channel for the respective latch element such that the respective latch element is adapted to travel in the respective longitudinal outboard channel when the at least two depending legs are inserted into the ring;

each of the at least one corresponding arcuate outboard channel is bifurcated by the respective longitudinal outboard channel and each corresponding arcuate out-board channel has a first and a second rotational outboard stop such that the respective latch element is adapted to travel in a first part of the bifurcated arcuate outboard channel upon handle rotation in the one direction and adapted to assist cylinder implantation into the earth and such that the respective latch element is adapted to travel in a second part of the bifurcated arcuate outboard channel upon handle rotation in the another direction and adapted to assist cylinder extraction from the earth.

14. A termite bait station adapted to be screwed into earth and adapted to accept a termite bait stick comprising:

an elongated cylinder forming a chamber, the cylinder having an open top adapted to accept the termite bait stick into the chamber, the open top formed by a ring at an upper end of the cylinder, the cylinder having a plurality of slots exposing the chamber to the earth;

a detachable cap for closing the open top;

a screw thread formed on a portion of an outer surface of the cylinder;

a detachable handle having a laterally extending handle hold substantially normal to the elongated cylinder, the handle having a depending collar element which coacts with the ring;

a ring bearing interlockable member on the ring and a complementary collar bearing interlock member, the ring bearing member adapted to lock into the collar bearing member such that when locked, upon handle rotation in one direction the cylinder is adapted to be implanted in the earth and upon handle rotation in another direction the cylinder is adapted to extract the cylinder from the earth.

15. A termite bait station adapted to be screwed into earth and adapted to accept a termite bait stick comprising:

an elongated cylinder forming a chamber, the cylinder having an open top adapted to accept the termite bait stick into the chamber, the open top formed by a ring at an upper end of the cylinder, the cylinder having a plurality of slots exposing the chamber to the earth;

the ring carrying a rotatable latch with an actuatable lever and a catch hook adapted to rotate by the lever;

a detachable cap for closing the open top;

a screw thread formed on a portion of an outer surface of the cylinder;

a detachable handle having a laterally extending handle hold substantially normal to the elongated cylinder, the handle having a depending strike plate which cooperates with catch hook and adapted to lock the handle onto the ring and the cylinder such that when locked, handle rotation in one direction causes the cylinder to be implanted in the earth and upon handle rotation in another direction causes the cylinder to be extracted from the earth.

16. A termite bait station adapted to be screwed into earth and adapted to accept a termite bait stick comprising:

an elongated cylinder forming a chamber, the cylinder having an open top adapted to accept the termite bait stick into the chamber, the open top formed by a ring at an upper end of the cylinder, the cylinder having a plurality of slots exposing the chamber to the earth;

the ring having a depending strike plate;

a detachable cap for closing the open top;

a screw thread formed on a portion of an outer surface of the cylinder;

a detachable handle having a laterally extending handle hold substantially normal to the elongated cylinder;

the handle having opposing depending legs supporting a rotatable latch with an outboard extending user actuatable lever and an inboard catch hook adapted to rotate by the lever;

the catch hook adapted to capture the depending strike plate and lock the handle onto the ring and the cylinder such that when locked, handle rotation in one direction causes the cylinder to be implanted in the earth and upon handle rotation in another direction causes the cylinder to be extracted from the earth.

17. A termite bait station adapted to be screwed into earth and adapted to accept a termite bait stick comprising:

an elongated cylinder forming a chamber, the cylinder having an open top adapted to accept the termite bait stick into the chamber, the open top formed by a ring at an upper end of the cylinder, the cylinder having a plurality of slots exposing the chamber to the earth;

a detachable cap for closing the open top;

a screw thread formed on a portion of an outer surface of the cylinder;

a detachable handle having a laterally extending handle hold substantially normal to the elongated cylinder, the handle having at least two depending legs which cooperate with at least two detents in the ring such when depending legs engage the detents, upon handle rotation in one direction the cylinder is adapted to be implanted in the earth and upon handle rotation in another direction the cylinder is adapted to extract the cylinder from the earth;

wherein the handle is a T-shaped handle with a depending member forming a base of the T-shaped handle and the laterally extending handle hold formed by a top of the T-shaped handle;

wherein the at least two depending legs depend from the depending member and the at least two depending legs cooperate with the at least two detents such that the cylinder is adapted to be implanted in the earth by handle rotation in one direction and extracted from the earth by handle rotation in the another direction;

wherein the at least two detents are formed on an outboard surface of the ring; and wherein the at least two depending legs each have a respective laterally inboard extending terminal end, the respective terminal end adapted to cooperate with a corresponding one of the at least two detents.

* * * * *